United States Patent [19]

Kramer

[11] 3,724,490

[45] Apr. 3, 1973

[54] GATE VALVE

[75] Inventor: Walter W. Kramer, Allentown, Pa.

[73] Assignee: Fuller Company, Catasauqua, Pa.

[22] Filed: July 6, 1970

[21] Appl. No.: 52,316

[52] U.S. Cl.................................................137/340
[51] Int. Cl.............................................F16k 49/00
[58] Field of Search ..251/329; 137/340; 55/432, 433

[56] References Cited

UNITED STATES PATENTS

| 1,056,552 | 3/1913 | Jorgensen | 55/432 X |
| 1,301,372 | 4/1919 | Briggs | 55/433 X |
| 2,925,177 | 2/1960 | Troland | 209/211 |
| 3,292,654 | 12/1966 | Rappold et al. | 137/340 |
| 327,548 | 10/1885 | Hartman | 137/340 X |
| 541,990 | 7/1895 | Christie | 137/340 |
| 1,031,539 | 7/1912 | Donovan | 137/340 |
| 3,447,222 | 6/1969 | Bunch et al. | 251/329 X |

FOREIGN PATENTS OR APPLICATIONS

| 76,049 | 7/1894 | Germany | 137/340 |
| 429,028 | 5/1935 | Great Britain | 55/433 |

Primary Examiner—Henry T. Klinksiek
Attorney—Jack L. Prather and Frank H. Thomson

[57] ABSTRACT

A water cooled gate valve for use with high temperature materials. The valve includes a valve body having a material flow passage therethrough. A housing surrounds and is spaced from the valve body and defines with the valve body a chamber. Cooling fluid such as water is circulated in this chamber. The gate of the valve is hollow and is provided with an arrangement for circulating cooling fluid therein. The valve may be used in pairs in conjunction with a gas-solids separator such as a cyclone separator.

8 Claims, 7 Drawing Figures

PATENTED APR 3 1973 3,724,490

INVENTOR
WALTER W. KRAMER

BY
Frank H. Thomson
Jack L. Prather
ATTORNEY

INVENTOR
WALTER W. KRAMER

GATE VALVE

BACKGROUND OF THE INVENTION

The present invention relates to gate valves and in particular to a gate valve which is designed for use in controlling the flow of high temperature material, on the order of 2500°F.

Prior to the present invention, gate valves which included a gate intersecting a longitudinal flow path through the valve were generally know. It has been found that these gate valves and many other types of valves have not been suitable when working with high temperature materials. With convention valves and particularly conventional gate valves, when the valve is used for controlling the flow of high temperature material, the high temperature adversely affects the operation and sealing ability of the valve and very often destroys the valve. Merely using a valve constructed of material which is capable of withstanding high temperatures is not always satisfactory. It would be desirable to provide a cooled valve and the present invention has satisfied that desire.

The present invention was originally designed for use with cyclone separators. In cyclone separators, gas to be cleaned tangentially enters a housing and centrifugal force causes the particulate matter to flow downwardly towards a product outlet. Cleaned gas flows upwardly through the center of the housing towards a cleaned gas outlet. In order to insure proper operations of the separator, it is essential that a seal be formed between the bottom product discharge outlet and atmosphere. If this seal is broken, the dirty gas will flow from the inlet directly to the solids discharge and separation will not take place. It is common practice with separators of this type to provide a pair of cooperating swing gate valves. When one valve opens, the other is closed and the opening and closing of the valves alternates so that at no time is there communication between atmosphere and the cyclone through the product discharge outlet. Prior to the present invention, if the product being separated was at high temperature, the heat transferred to the valve would result in valve malfunction and destruction of the seal which must be maintained by the valves.

SUMMARY

It is, therefore, the principal object of this invention to provide a gate valve which is cooled so that it is capable of controlling the flow regardless of high temperature material being controlled.

It is a further object of this invention to provide a cooled gate valve assembly wherein both the valve body and the valve gate are cooled so that the valve is capable of handling very high temperature material.

It is a still further object of this invention to provide a gate valve assembly which is adapted to be used in conjunction with a cyclone separator and capable of handling a high temperature material.

In general, the foregoing and other objects will be carried out by providing a gate valve comprising a valve body having a flow passage therethrough; a hollow casing surrounding said valve body and spaced from said valve body to define with said valve body a chamber; means for supplying a fluid to said chamber for controlling the temperature of said valve body; means defining a radially extending slot in said valve body and casing which intersects the flow passage through said valve body; hollow gate means movably mounted in said slot for closing said flow passage; means for supplying fluid to the inside of said gate means for controlling the temperature of the gate means; and means for moving said gate within said slot.

BRIEF DESCRIPTION OF THE DRAWINGS

The invention will be described in connection with the annexed drawings wherein.

DESCRIPTION OF THE PREFERRED EMBODIMENT

Figure 2:
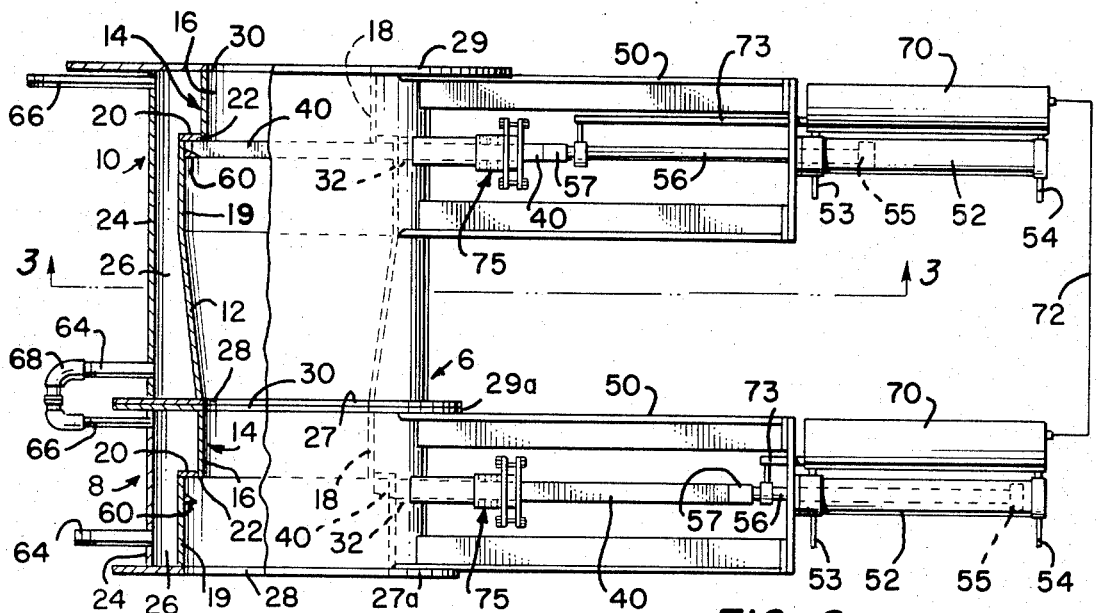
FIG. 2 is an elevational view, partly in section, of the gate valve assembly of the present invention as it would be used with a cyclone separator.
Figure 3:
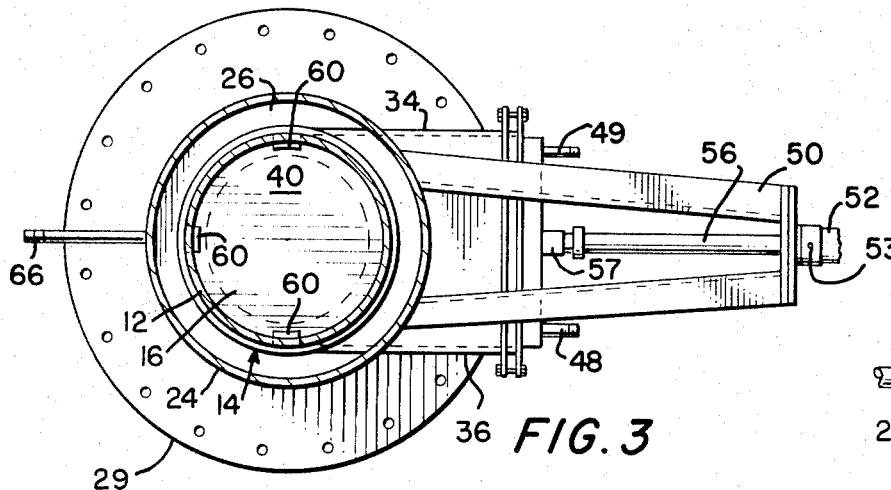
FIG. 3 is a sectional view taken on the line 3—3 of FIG. 2 in the direction of the arrows.
Figure 1:
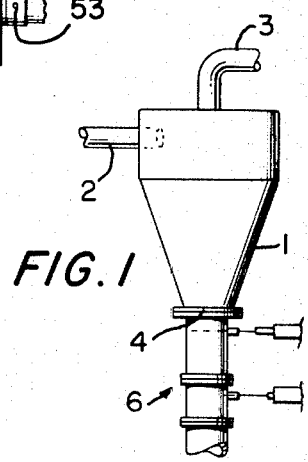
FIG. 1 is a generally diagrammatic view of the gate valve of the present invention as it is used with a cyclone separator.
Figure 4:
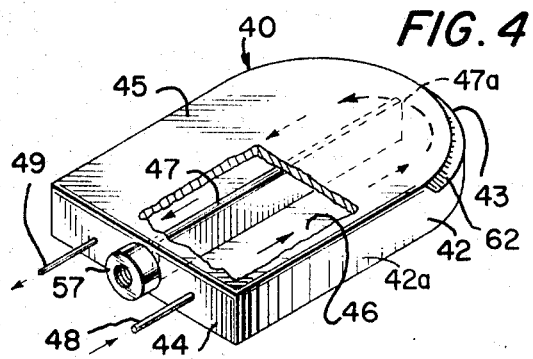
FIG. 4 is a bottom perspective view, partly in section, of the gate of the present invention.
Figure 6:
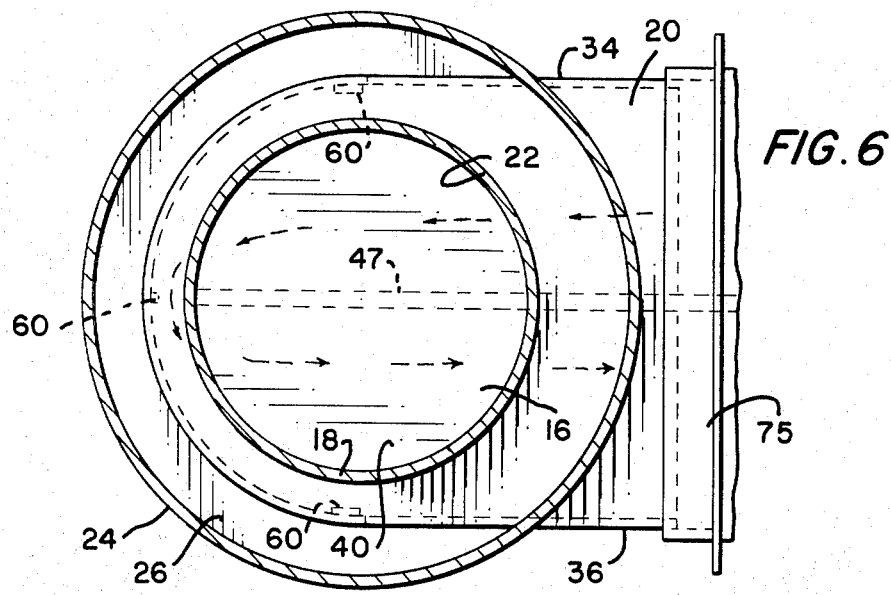
FIGS. 6 and 7 are sectional views taken on the lines 6—6 and 7—7, respectively, of FIG. 5, on a smaller scale.
Figure 5:
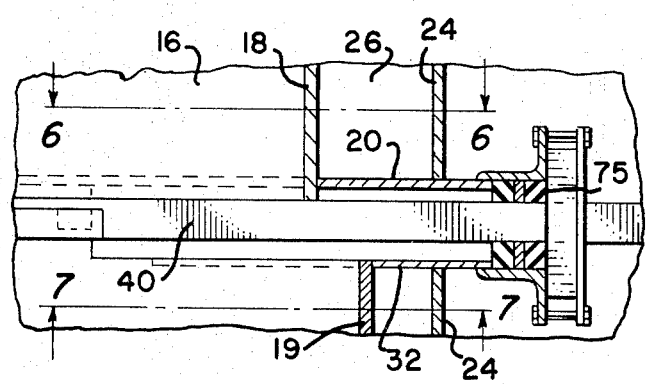
FIG. 5 is a fragmentary sectional view of a portion of FIG. 2.
Figure 7:
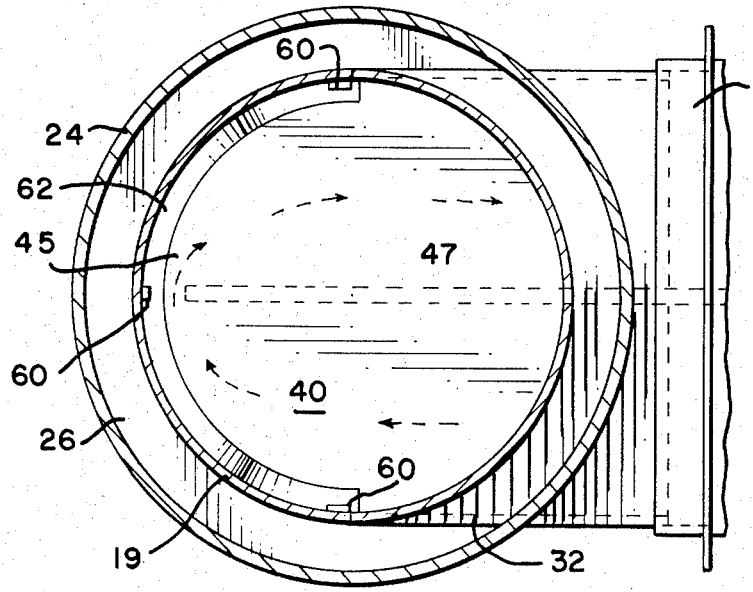

Although the invention will be described as it would be used with a cyclone separator, it should be understood that the invention may be used wherever it is desired to provide a gate valve for handling materials of extreme temperatures, either high or low. Referring to FIG. 1, there is shown a cyclone separator 1 of a well-known configuration which includes a tangential inlet 2 for gas to be cleaned, a cleaned gas outlet 3 and a product outlet 4. The gate valve assembly of the present invention is generally indicated at 6 and mounted in the product discharge 4 of the cyclone 1.

Referring to FIGS. 2 to 7, the gate valve assembly of the present invention will be described. The gate valve assembly 6 comprises a pair of gate valves generally indicated at 8 and 10. Each of the gate valves is substantially the same in construction and operation and like parts will be designated by like numerals. However, the gate valve 10, closest to the discharge 4 of the cyclone 1, is provided with a tapered valve body conduit 12.

Each gate valve includes a valve body 14 which defines a flow passage 16 for material. The valve body 14 includes a first cylindrical member 18 and a second cylindrical member 19 coaxially aligned with the first member 18 and having a diameter larger than the first cylindrical member 18. A plate member 20, best shown in FIG. 6, having a circular cutout 22 is mounted on second cylindrical member 19 to connect member 19 to member 18 and further define flow passage 16.

The valve body 14 is surrounded by a casing 24 which is spaced from the valve body 14 to define a chamber 26. A bottom flange 27 having an opening 28 is secured to the casing 24 and second cylindrical member 19 to close the bottom of the chamber 26, and an upper flange 29 having an opening 30 is secured to the top of the casing 24 and first cylindrical member 18 to close the top of the chamber 26. The flange 29 of valve 10 may be used to secure the valve assembly 6 to the cyclone 1 and the flange 27a of valve 8 may be used to secure a conduit to the valve assembly 6. The valves 8 and 10 are secured to each other through the flange 27 of valve 10 and flange 29a of valve 8 and suitable fasteners (not shown).

Cooling fluid such as water is supplied to the chamber 26 by means of an inlet pipe 64 and an outlet pipe 66. The inlet pipe 64 has a diameter larger than the outlet pipe 66. Communication is provided between the upper valve 10 and the lower valve 8 by means of a coupling 68. The inlet conduit 64 has a diameter larger than the diameter of the outlet 66 to insure complete filling of cooling liquid and elimination of air pockets in chamber 26.

Each gate valve 8 and 10 is provided with a slot which extends through the valve body 14 and casing 24 transverse to the flow passage 16 and is hereinafter referred to as means defining a radially extending slot through the valve body 14 and casing 24. This means includes the plate 20 which extends radially beyond the casing wall 24, a bottom plate 32, best shown in FIG. 7, which extends from second cylindrical member 19 radially through casing wall 24, and side plates 34 and 36 which extend from approximately the center line of the flow passage 16 of valve 10. The flange 27a and 29a of valve 8 are similar to flanges 27 and 29, respectively, of valve 10 radially outwardly through the casing 24. The walls 20, 32, 34 and 36 insure that water circulating in chamber 26 does not mix with the material in flow passage 16 or leave the chamber 26 through the slot.

A gate generally indicated at 40 is slideably mounted in the means defining a slot between a position which closes the flow passage 16 and opens this flow passage. The gate includes a U-shaped side wall 42 having legs 42a and a curved base 43. An end plate 44 closes the ends of the U-shaped side wall 42. A top plate 45 and a bottom plate 46 close the gate to thereby define a hollow gate. A partition 47 is provided on the inside of the gate 40 and extends from the end plate 44 towards the curved base 43 but terminates short of the base 43. The partition is welded to the plates 45 and 46 so that communication between the compartments on opposite sides of the partition 47 is provided solely through the space or passage 47a between the partition 47 and the base 43.

Cooling fluid such as water is supplied to the inside of the hollow gate 40 by means of an inlet pipe 48 and an outlet pipe 49. The inlet pipe 48 has a diameter larger than that of the outlet pipe 49 to insure that the cooling fluid completely fills the cooling chamber within the hollow gate 40. Because the sole communication between the compartments on opposite sides of the partition 47 is near the outer edge of the gate, the entire gate is cooled.

In order to prevent material from leaving the flow passage in the valve assembly through the slot defined by the plates 20, 32, 34 and 36, a packing assembly 75 has been provided. This packing wipes the gate 40 each time it is opened or closed.

A suitable A-frame or other support arrangement 50 is secured to the casing 24 by any suitable means such as welding. A fluid pressure operated piston-cylinder arrangement 52 is on the support 50 and includes a pair of fluid supply and exhaust conduits 53 and 54. A piston 55 is mounted for reciprocal movement in cylinder 52 and has connected thereto a piston rod 56. The gate 40 is provided with a coupling member 57 on the end plate 44 and the piston rod 56 is secured to this coupling member. This arrangement defines means for moving the gate within the slot. When it is desired to close the gate, fluid under pressure is supplied to cylinder 52 through conduit 54 to act on piston 55 and move the gate. Fluid in the cylinder on the opposite side of piston 55 is exhausted through conduit 53. When it is desired to open gate 40, fluid under pressure is supplied to conduit 53 and fluid on the opposite side of piston 55 is exhausted through conduit 54.

The gate is positioned in the slot so that in the open position, there is a clearance between the bottom of the first cylindrical member 18 and the top of the gate. A plurality of wedges 60 are mounted on the second cylindrical member 19 for engaging a tapered portion 62 on the bottom of the gate so that when the gate is closed the wedges 60 will co-act with the taper 62 to move the gate 40 into engagement with the bottom of the first cylindrical member 18 and provide a material seal.

When the valve assembly 6 is used with a cyclone separator, it is necessary to coordinate the opening and closing of the valves 8 and 10 so that one valve does not open until the other is closed. In order to carry out this function, suitable electrical control apparatus such as microswitches may be mounted in a housing 70. The switches are operated by a rod 73 connected to the piston rod 56. The switches in the housings 70 may be interconnected by an electrical line 72 and supplied with power from a suitable service (not shown). The operation of these microswitches control the opening and closing of valves (not shown) which regulate the flow of fluid under pressure to the cylinders 52. The control system used with the valves of the present invention do not form a part of the present invention.

In operation of the cyclone, dust and other solid material removed from the dirty gas will collect on the gate 40 of valve 10. After a certain period of time, valve 8 will close. After a time delay, valve 10 will open and collected solids will drop through the flow passage onto gate 40 of valve 8. After a certain length of time, valve 10 will close. After another time delay, the microswitches in housing 70 will cause valve 8 to open and material will be discharged to a suitable conveyor.

From the foregoing, it should be apparent that the objects of the present invention have been carried out. A cooled gate valve has been provided wherein both the valve body and the valve gate are cooled by means of a cooling fluid such as water. The arrangement insures that the cooling fluid will not mix with the product and that neither the cooling fluid nor the product will escape the valve. The valve is particularly useful with cyclone separators because the cooling of the valves insures a proper seal to insure proper operation of the separator. It is intended that the foregoing be merely that of a preferred embodiment and that the invention be limited solely by that which is within the scope of the appended claims.

I claim:

1. A gate valve comprising:
   a valve body having a flow passage therethrough;

a hollow casing surrounding said valve body and spaced from said valve body to define with said valve body a chamber;

means connected to said casing for supplying a fluid to said chamber for controlling the temperature of said valve body;

means defining a radially extending slot in said valve body and casing which intersects the flow passage through said valve body;

hollow gate means movably mounted in said slot for closing said flow passage;

means connected to said gate means for supplying fluid to the inside of said gate means for controlling the temperature of the gate means; and means connected to said gate means for moving said gate within said slot;

said means defining a radially extending slot includes wall means extending between said valve body and said casing for preventing the fluid for controlling the temperature of the valve body from escaping from said chamber through said slot while permitting the fluid to completely surround said slot;

said valve body including a first cylindrical member and a second cylindrical member coaxially aligned with and having a diameter larger than the diameter of said first cylindrical member, and a plate member connecting said first and second cylindrical members which forms part of said wall means.

2. The gate valve of claim 1 wherein said hollow gate means includes U-shaped side wall having a pair of legs and a base interconnecting the legs at one end, an end plate interconnecting the legs at the other end, a top wall, a bottom wall, and partition means disposed inside the gate dividing the inside of the gate into at least two compartments and defining at least one passage flow connecting said compartments.

3. The gate valve of claim 2 wherein said partition extends from said end plate toward said base and terminates short of said base to thereby define a passage flow connecting said chambers.

4. The gate valve of claim 3 wherein said means for supplying fluid to said gate means includes a first conduit for supplying fluid to one of said compartments and a second conduit for conducting fluid from said second compartment.

5. The gate valve of claim 4 wherein said first conduit has a diameter larger than said second conduit.

6. The gate valve of claim 3 further comprising a valve seat extending substantially completely around the periphery of said flow passage and wedge means mounted on said second cylindrical member for moving said gate means into contact with said valve seat when said gate is in a position which closes the flow passage through said valve body.

7. The gate valve of claim 6 wherein said means for supplying fluid to said gate means includes first conduit means for conducting fluid to the gate means and second conduit means for conducting fluid from the gate means, said first conduit means having a diameter larger than said second conduit means.

8. The gate valve of claim 7 wherein the fluid for controlling the temperature of the gate means and the fluid for controlling the temperature of the valve body is a liquid for cooling the gate means and the valve body, and said means for supplying a fluid to said chamber includes third conduit means for conducting liquid to said chamber and fourth conduit means for conducting liquid from said chamber, said third conduit means having a diameter larger than said fourth conduit means.

* * * * *